L. W. WILLIAMS.
COLT'S MUZZLE.
APPLICATION FILED DEC. 3, 1919.
1,401,848.
Patented Dec. 27, 1921.
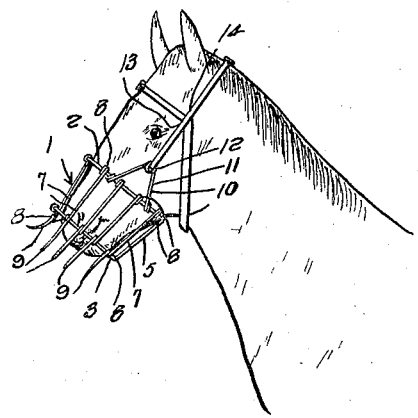
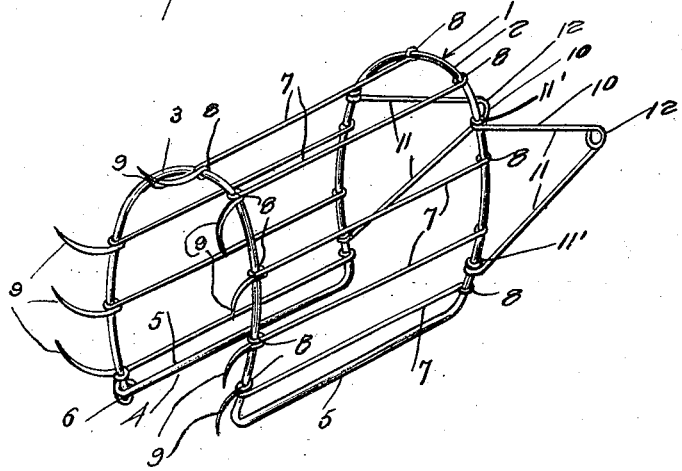
Inventor
L. W. Williams
By *[signature]*, Attorney

UNITED STATES PATENT OFFICE.

LEWIS W. WILLIAMS, OF CHANDLER, OKLAHOMA.

COLT'S MUZZLE.

1,401,848.　　　　　Specification of Letters Patent.　　Patented Dec. 27, 1921.

Application filed December 3, 1919. Serial No. 342,066.

*To all whom it may concern:*

Be it known that I, LEWIS W. WILLIAMS, a citizen of the United States, residing at Chandler, in the county of Lincoln and State of Oklahoma, have invented certain new and useful Improvements in Colts' Muzzles; and I do hereby declare the following to be a full, clear, and exact description of the invention, such as will enable others skilled in the art to which it appertains to make and use the same.

This invention relates to colt muzzles and the primary object of the invention is to provide an improved device especially adapted for colts or other animals to prevent the same from sucking, and thus effectively wean the animals.

Another object of the invention is to provide an improved device of the above character which can be readily and quickly applied to or taken from a colt or calf and which will not injure the colt or calf in any way whatsoever.

A still further object of the invention is to provide an improved colt weaner of the above character, which is durable and efficient in use, one that is simple and easy to manufacture, and one that can be placed upon the market at a reasonable cost.

With these and other objects in view the invention consists in the novel construction, arrangement and formation of parts, as will be hereinafter more specifically described, claimed and illustrated in the accompanying drawings, forming a part thereof in which:

Figure 1 is a side elevation of the improved muzzle showing the same applied to a colt.

Fig. 2 is a detail perspective view of the same removed from the animal.

Referring to the drawings in detail, wherein similar reference characters designate corresponding parts throughout the several views, the numeral 1 generally indicates the improved device, which includes a pair of superimposed spaced substantially oval shaped supporting members 2 and 3 having their rear ends open and spaced, as at 4. The terminals of the oval members 2 and 3 are connected by bars 5, so as to hold the members in their correct spaced position. The members 2 and 3 and the connecting bars 5 are preferably formed of a single length of wire at a suitable gage and the terminals of the wire are connected together, as at 6. The arch members 2 and 3 are connected together by spaced parallel bars 7, which are coiled around the members 2 and 3, as at 8 so as to secure the same to the members and prevent movement of the members in relation to each other and to the bars. The lower terminals of the bars are extended below the lower member 3 and are curved outwardly therefrom to provide prongs or prods 9 which are adapted to stick the mare or cow when the device is applied to a colt or calf. The upper band or member 2 has hingedly secured thereto at opposite points the attaching members 10 which are preferably formed of wire or the like and include divergent legs 11 which have their terminals coiled as at 11' to receive the upper band or member 2. The meeting points of the legs 11 are coiled to provide eyes 12 for the reception of a suitable strap 13 which extends over the head of the colt or calf. The strap 13 if desired may be connected by a brow band 14. The device is slipped over the nose of the colt or calf and the strap 13 is placed around the animal's head and adjusted in correct position. The downwardly extending prongs 9 will effectively prevent the colt from sucking.

In practice, I have found that the form of my invention illustrated in the accompanying drawings and referred to in the above description, as the preferred embodiment, is the most efficient and practical; yet realizing the conditions concurrent with the adoption of my device will necessarily vary, I desire to emphasize that various minor changes in details of construction, proportion and arrangement of parts may be resorted to, when required without sacrificing any of the advantages of my invention as set forth.

What I claim as new is:

1. A weaner having a frame provided with spaced arch members and connecting portions joining the same, and a rod extending from one of said members to the other to brace the same, said rod being coiled around one of the arches and a portion integral with the rod extending beyond the coil as a prod.

2. A weaner having a frame of a single strand of material provided with spaced arch members and connecting portions joining the same, rods each coiled to each of said arched members, prods extending integrally from the coils beyond one of said arch members, and attaching means secured to the other arch member.

In testimony whereof I affix my signature in presence of two witnesses.

LEWIS W. WILLIAMS.

Witnesses:
 F. HOOD,
 A. B. CUNNINGHAM.